(12) United States Patent
Muller

(10) Patent No.: US 8,532,689 B2
(45) Date of Patent: Sep. 10, 2013

(54) TRANSMISSION BEHAVIOUR FOR SUPPORT OF CELL MEASUREMENTS

(75) Inventor: Walter Muller, Upplands Vasby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 588 days.

(21) Appl. No.: 12/740,524

(22) PCT Filed: Oct. 31, 2008

(86) PCT No.: PCT/SE2008/051243
§ 371 (c)(1),
(2), (4) Date: Apr. 29, 2010

(87) PCT Pub. No.: WO2009/058091
PCT Pub. Date: May 7, 2009

(65) Prior Publication Data
US 2010/0311426 A1    Dec. 9, 2010

Related U.S. Application Data

(60) Provisional application No. 60/984,171, filed on Oct. 31, 2007.

(51) Int. Cl.
*H04B 7/00* (2006.01)
(52) U.S. Cl.
USPC ........ 455/522; 455/450; 455/451; 455/452.1; 455/452.2; 455/453; 455/509; 455/560; 455/561; 455/69; 370/317; 370/318; 370/329; 370/330; 370/336; 370/337; 370/342; 370/345; 370/347
(58) Field of Classification Search
USPC ................ 455/450, 451, 452.1, 452.2, 453, 455/509, 560, 561, 522, 63.1, 67.13, 69; 370/317, 318, 328, 329, 330, 335, 336, 337, 370/342, 345, 347
See application file for complete search history.

(56) References Cited

U.S. PATENT DOCUMENTS 5,839,056 A * 11/1998 Hakkinen ........................ 455/69
6,144,841 A * 11/2000 Feeney ............................ 455/69
(Continued)

FOREIGN PATENT DOCUMENTS
CN    1440596 A    9/2003
WO    0203566 A2    1/2002

OTHER PUBLICATIONS

Sang, A. et al. "Coordinated Load Balancing, Handoff/Cell-Site Selection, and Scheduling in Multi-Cell Packet Data Systems." Wireless Networks; The Journal of Mobile Communication, Computation and Information, Kluwer Academic Publishers, vol. 14, No. 1, Jun. 9, 2006.

(Continued)

*Primary Examiner* — Olumide T Ajibade Akonai
(74) *Attorney, Agent, or Firm* — Coats and Bennett PLLC

(57) ABSTRACT

The present invention relates to a cellular communication and addresses the problem of an LTE UE measuring downlink quality when the load in cell varies instantaneously and over a wide frequency spectrum. The UE lacks capacity to measure over frequency bandwidth and time needed to make a cell load measure with sufficient reliability for making a inter-cell handover or an inter RAT handover. The solution is the DL power transmitted in a narrow band of the carrier frequency is adjusted to reflect the total cell load. The total cell load is measured and averaged over time and made proportional to the frequency carrier bandwidth. The power may be controlled for specific time slots in the narrow frequency band for the terminal to measure on. This is advantageous because then the waste power needed for enabling the UE measured can be reduced and the extra interference caused by the invention be reduced.

20 Claims, 11 Drawing Sheets

(56) References Cited

U.S. PATENT DOCUMENTS

| | | | |
|---|---|---|---|
| 6,415,153 B1 * | 7/2002 | Liew | 455/453 |
| 6,529,482 B1 * | 3/2003 | Lundby | 370/252 |
| 7,016,686 B2 * | 3/2006 | Spaling et al. | 455/453 |
| 7,620,004 B2 * | 11/2009 | Brueck et al. | 370/317 |
| 7,720,503 B2 * | 5/2010 | Kwon et al. | 455/522 |
| 7,742,781 B2 * | 6/2010 | Chen et al. | 455/522 |
| 7,826,417 B2 * | 11/2010 | Yang et al. | 370/329 |
| 7,831,273 B2 * | 11/2010 | Suonvieri | 455/522 |
| 7,974,652 B2 * | 7/2011 | Gerlach et al. | 455/522 |
| 8,150,442 B2 * | 4/2012 | Kashiwagi et al. | 455/522 |
| 2007/0127359 A1 * | 6/2007 | Ahn et al. | 370/208 |
| 2008/0045260 A1 * | 2/2008 | Muharemovic et al. | 455/522 |

OTHER PUBLICATIONS

3rd Generation Partnership Project. "Handling of RRM in a Decentralised RAN Architecture." 3GPP TSG RAN WG3, R3-060029, Sophia-Antipolis, France, Jan. 10-12, 2006.

* cited by examiner

TRANSMISSION BEHAVIOUR FOR SUPPORT OF CELL MEASUREMENTS

TECHNICAL FIELD OF THE INVENTION

The present invention relates to cellular radio communication and in particular to a method, enabling terminals to make quality measures on the radio signals transmitted in cells and use those measures for load control, and to a network node for performing the method.

DESCRIPTION OF RELATED ART

In a cellular communication system, a user equipment (UE) can typically establish communications with a base station serving a cell, in order to be able to transmit and receive signals. Such systems typically define a handover mechanism, whereby a UE that has established communications with one cell can handover communications to another cell, for example in order to improve the quality of its communication channel with the respective base station. In order to determine that its current cell does not provide good enough downlink (DL) quality and preferably also to determine that there is another cell on another frequency that has a high probability of being able to do so, DL quality estimates are typically used.

The DL quality, if averaged, should also a give an indication that the other cell, referred to as the target cell, has a high probability of being able to provide good DL quality for a reasonably long time, typically at least a couple of seconds, after the handover, so that the performance impact of performing a handover is fully compensated. That is, it is preferable to avoid performing handovers too frequently.

For this purpose, one property of the estimate that is very beneficial for avoiding too frequent handovers is that the UE can measure the same physical signal both before and after the handover and can thus use a simple hysteresis threshold to avoid too frequent handovers backwards and forwards between two cells.

Another beneficial property is that the estimate should be time independent. That is, samples can be taken at any time and still be representative for the cell in general within a couple of seconds.

If the DL quality estimate also is cell load dependent the estimate can be used for being able to control the UE distribution between Inter-frequency cell layers both for idle mode UEs but also for RRC connected mode UEs.

The load dependent DL quality estimate can also be used to influence the decision for which cell is the best cell to use as the serving cell at a particular time within a frequency layer. In practice, using this option will cause a handover border between a serving cell and a target cell to be adapted (moved back and forth) depending on the load situation in the serving cell or the target cell. If the serving cell has a high load and the target does not, the handover border can be moved in such a way as to expand the target cell.

In this context, the term "cell load" shall be taken in a general sense to mean the Radio Resource load or the Transport Network load on the cell, or the hardware load, the processing load, or the signalling load on the base station itself, or any other measure. The term "traffic load" refers to the Radio Resource load caused by UEs.

It should also be possible to use DL quality estimates for taking decisions as to whether Inter Radio Access Technology (IRAT) measurement and handover attempts should be made, in order not to lose the connection when moving out of the coverage area of a network.

In wireless communications networks using Wideband Code Division Multiple Access (WCDMA), the Common Pilot Channel (CPICH) Ec/No (i.e. the received energy per chip divided by the total energy in the band) is an example of a DL quality estimate that has all of the above stated properties. One reason for this is that the CDMA technology spreads the power over the entire allocated bandwidth for each transmitted signal, regardless of whether the transmitted signal is for a UE or is transmitting pilots or other common channels.

The Long Time Evolution path (LTE) for upgrade of cellular networks is standardized by 3GPP and is then named Extended UMTS Terrestrial Radio Access (E-UTRA). A cell in a LTE system is assigned a frequency carrier, and resources on the carrier are scheduled in the time and frequency domains to different mobile terminals, or User Equipments (UE) in LTE terminology. If more than one frequency carrier is assigned for service at the same site, by 3GPP current definition they are allocated two different cells that may have overlapping coverage. In LTE there is no continuous transmission from the cell and the power from the cell will depend on the scheduling of transmission from the cell.

Also in LTE, when doing mobility measurements on target cells the UE expects any target cell to transmit reference symbols and synch channels periodically within 6 center Resource Blocks (RB) i.e. within a 6 RB*12 Subcarriers*15 kHz=1.08 MHz band at the center of the DL carrier to allow the UE to do cell search, cell identification and time and frequency synchronization. There is also capacity in the 1.08 MHz band for scheduled transmissions to specific UEs. Note that 6 RB correspond to a Carrier BW of 1.4 MHz for a cell and that is the minimum Carrier BW supported in 3GPP today.

When doing Channel quality measurements to be reported to the network for link adaptation and scheduling purposes, the UE will use the full bandwidth of the cell. This means that reference symbols are also transmitted outside the 6 center resource blocks. More detail on this can be obtained from 3GPP TS 36.300, TS 36.211, and TS 36.213.

When UEs are measuring a Received Signal Strength Indicator (RSSI) and Received Reference Symbol Power (RSRP), to be used for Reference Symbol Received Quality (RSRQ) as defined in 3GPP TS 36.214, the RSSI and consequently the RSRQ will vary depending on the scheduled transmissions from the cell, and will also vary depending on when the samples of RSSI are taken, and will thus provide an ambiguous estimate of the DL quality representing the cell load.

SUMMARY OF THE INVENTION

According to a first aspect of the invention, there is provided a method for controlling a cell, wherein the cell is assigned a first frequency carrier and downlink transmissions to specific mobile terminals are scheduled in time and in frequency over the first frequency carrier, and wherein the first frequency carrier includes a second frequency band. Firstly, an average load measure relating to the cell is formed. Then, the power transmitted in the second frequency band is controlled to reflect the average load measure.

According to a second aspect of the invention, there is provided a network node adapted to perform the method according to the first aspect.

The UE is therefore enabled to make a quality measure that is controlled by the network and made representative for the cell and the cell load over its total frequency carrier. Preferably, this is applicable over a time period long enough for a handover decision. Preferably, this is achieved by intentionally scheduling UEs in a certain fashion and/or using dummy transmissions.

In embodiments of the invention, the solution may be to control the output power in a narrower band and typically only at certain time instances when the UE takes DL quality measurement samples within the frequency carrier to be at a level that reflects the cell load e.g. the total traffic load distribution over the total frequency carrier and over time. These time instances are the instances when the UE is taking samples for mobility measurements.

For example, in one embodiment, first the traffic load is determined by measuring the power over the total frequency carrier and averaging over time. The power in the narrow band is controlled either by scheduling DL transmissions to UEs that sum up at the determined power level, or by transmitting dummy power or a combination of the two. The power level is to be kept constant or with small changes over time and at least within time periods when UEs are expected to make DL quality measures.

DESCRIPTION OF PREFERRED EMBODIMENTS

Figure 1:
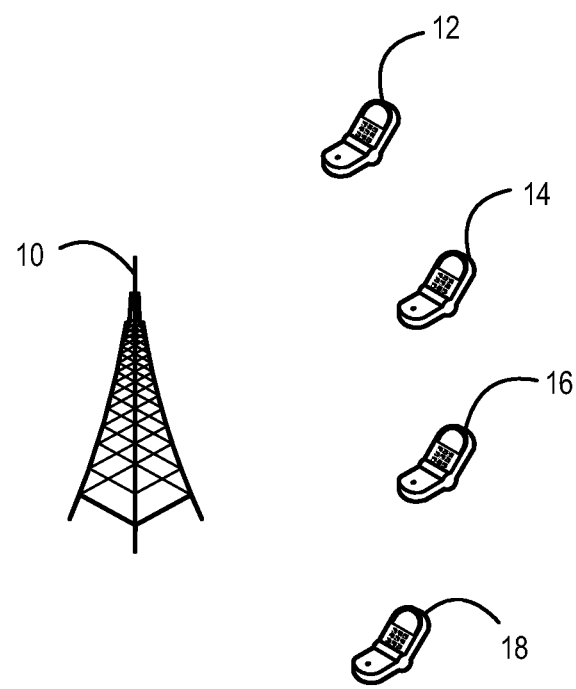
FIG. 1 illustrates a part of a wireless communication network operating in accordance with the present invention.

FIG. 1 illustrates a part of a wireless communication network operating in accordance with the present invention. Specifically, FIG. 1 shows a base station 10 serving a cell in which mobile devices, or user equipments (UEs) 12, 14, 16, 18 are active. As is well known, each of the UEs makes measurements on the signals transmitted by the base station 10, in order to form a measure of the downlink quality, for use for example when determining whether to handover from the cell. Similarly, a UE makes measurements on other cells, in order to determine whether it would be preferable to handover to one of the other cells. Specifically, a UE may measure the Received Signal Strength Indicator (RSSI) and/or the Reference Symbol Received Power (RSRP), and hence the Reference Symbol Received Quality (RSRQ), in a cell, and may use this quality measure in determining whether to handover to or from this cell, either as a complement to RSRP or by itself.

Figure 2:
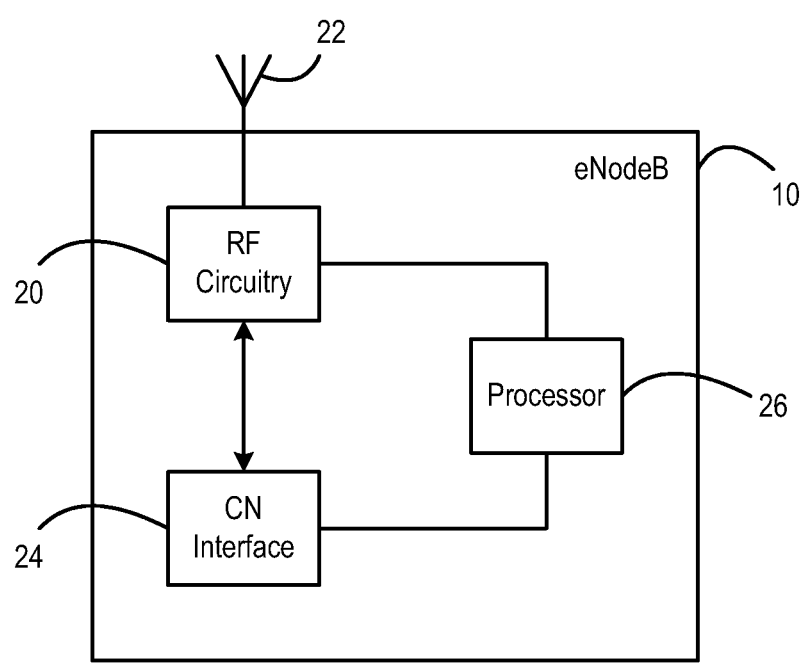
FIG. 2 is a schematic diagram, illustrating a network node in accordance with an aspect of the present invention.

FIG. 2 is a schematic diagram, illustrating a network node in accordance with an aspect of the present invention. Specifically, FIG. 2 illustrates the general form of the base station 10, referred to in an LTE network as an eNodeB.

The eNodeB 10 has radio frequency (RF) circuitry 20, connected to an antenna 22, for transmitting and receiving signals over a wireless interface to the UEs. In addition, there in a core network (CN) interface 24, for connecting the eNodeB 10 to a core network of the mobile communications network. The radio frequency circuitry 20 and the core network interface 24 operate under the control of a processor 26. This is generally well understood, and will not be described further herein. However, one aspect of such control is relevant for an understanding of the present invention, and is described in more detail below.

Figure 3:
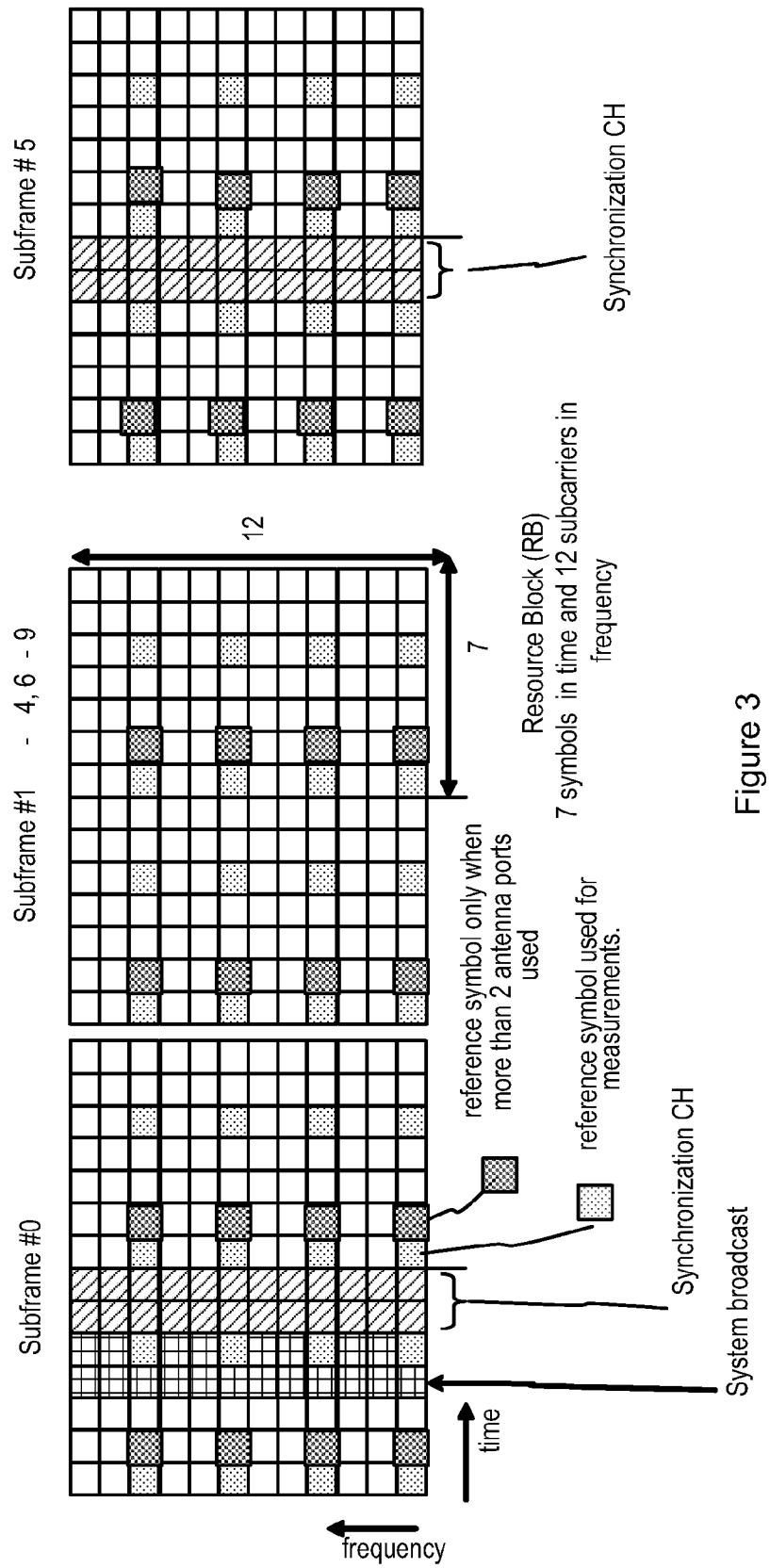
FIG. 3 illustrates a frame structure of the scheduling in time and frequency of resource blocks and their usage as defined by 3GPP for LT downlink.

FIG. 3 illustrates the downlink (DL) transmissions from a LTE frequency division duplex (FDD) cell in time (horizontal-axis) and frequency (vertical-axis).

Each small square in FIG. 3 corresponds to a duration of 1/14 ms (one OFDM symbol period) in time and 15 kHz (one sub-carrier) in frequency, and this is referred to as one resource element, which is the smallest amount of resource used for transmitting information.

A block of 12 sub-carriers (that is, having a bandwidth of 180 kHz) during a period equal to 7 symbol periods is referred to as one resource block (RB), The smallest amount of resource used for scheduling RRC signalling or user data to the UE is 2 RB consecutive in time. The time period equal to 7 symbol periods (i.e. 0.5 ms) is referred to as one slot, while two slots together form one sub-frame (1 ms), and 10 sub-frames together form one frame with duration of 10 ms.

The total bandwidth (BW) available for downlink transmissions from one cell may be up to 20 MHz, that is a bandwidth equal to 100 resource blocks using some margin. However, irrespective of the total available downlink bandwidth, a UE will typically make measurements on 6 resource blocks in the center of the Carrier BW to measure the downlink quality to be used for handover decisions, and these 6 resource blocks will thus correspond to 6*12=72 subcarriers.

FIG. 3 shows the structure of one frame, and specifically shows the structure of subframe #0, subframes #1-4 and 6-9 (these subframes all having the same structure) and subframe #5. As shown in FIG. 3, some of the resource elements in subframe #0 and subframe #5 of each frame are used for broadcasting a synchronization channel, some of the resource elements in subframe #0 are used for system broadcast, and some of the resource elements in each subframe are used for reference symbols, with some of these resource elements only being used for reference symbols in situations where more than two antenna ports are being used. The unshaded resource elements shown in FIG. 3 can be used for scheduled transmissions to UEs.

Figure 4:
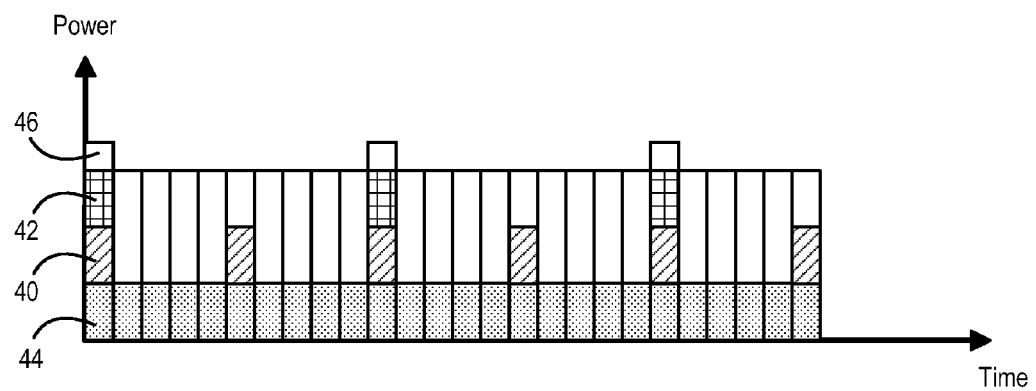
FIGS. 4 and 5 illustrate power distributions over time and frequency in specific circumstances.
Figure 5:
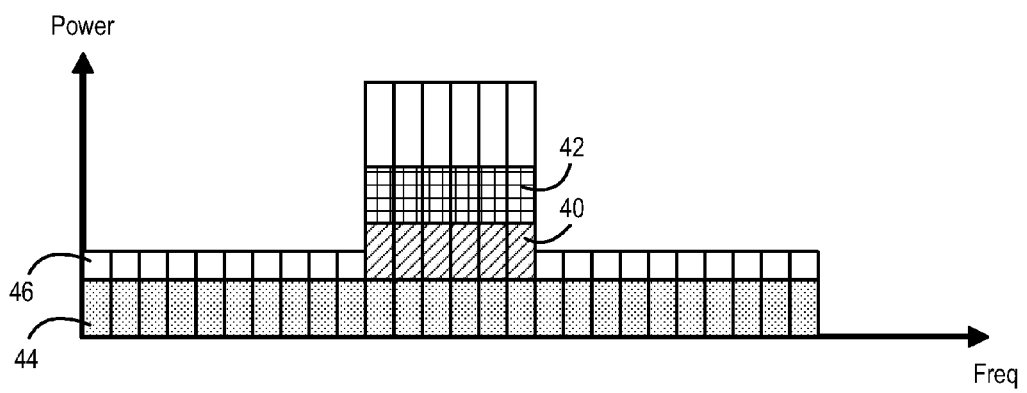

Based on the structure discussed above, FIGS. 4 and 5 show respectively the variation with time and frequency of the power transmitted on resource blocks, in the absence of any steps to control this. Specifically, FIG. 4 shows the variation of the power between different subframes, while FIG. 5 shows the variation between various resource blocks in the frequency domain, with the six central resource blocks having the highest transmitted power. In particular, FIGS. 4 and 5 show the situation when there are no UEs receiving transmissions from the cell. Thus, in FIG. 4, the power 40 representing the transmitted synchronization channel appears in subframe #0 and subframe #5 of each frame, while the power 42 representing the transmitted system broadcast appears in subframe #0 of each frame. These resource blocks need to be transmitted at constant power regardless of load, in order to keep the cell border consistent. The power 44 representing the transmitted reference signals, and the power 46 representing the transmitted data, appear in each subframe.

Figure 6:
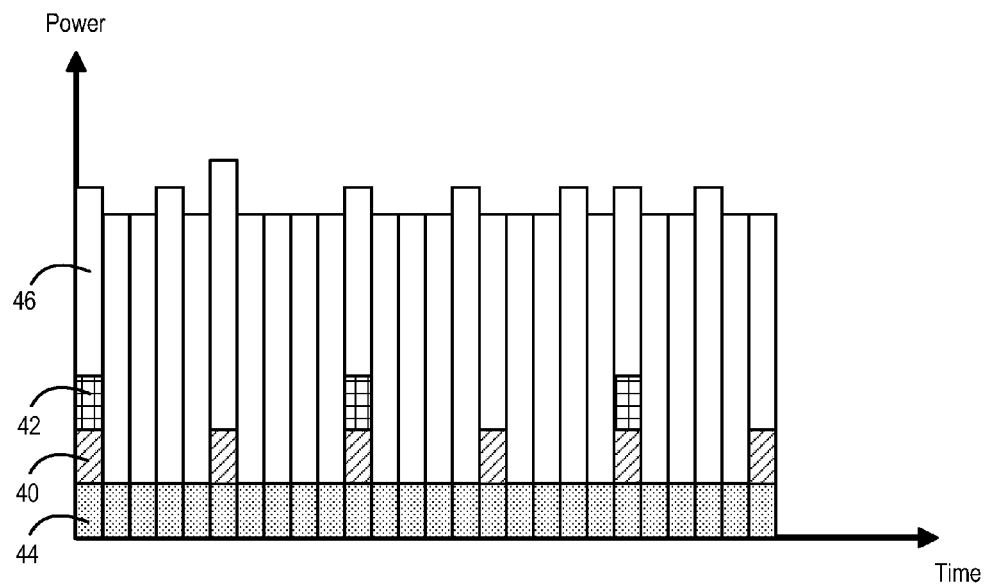
FIGS. 6 and 7 illustrate alternative power distributions over time and frequency in specific circumstances.
Figure 7:
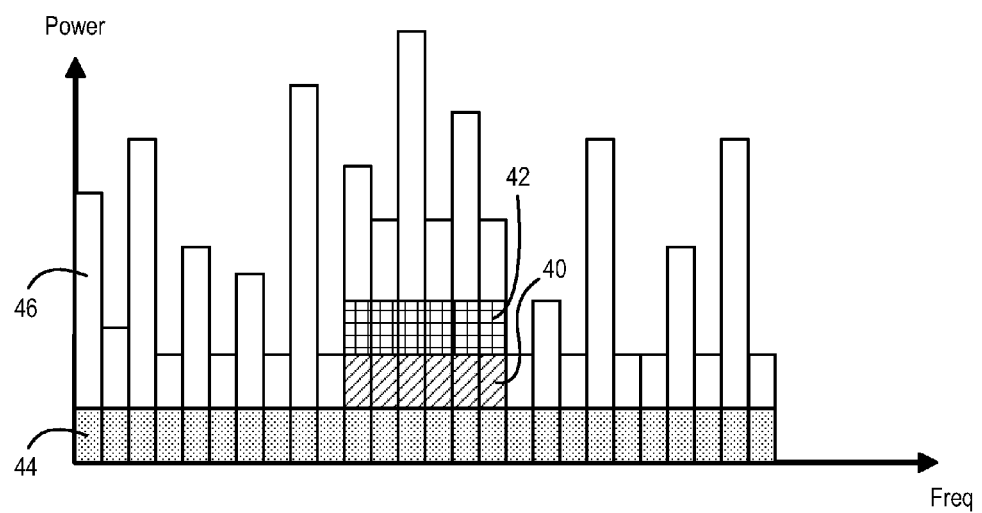

In addition, FIGS. 6 and 7 show respectively the variation with time and frequency of the power transmitted on resource blocks, in a situation where there are some UEs scheduled, again in the absence of any steps to control this. Thus, the power 40 representing the transmitted synchronization channel appears in subframe #0 and subframe #5 of each frame, and the power 42 representing the transmitted system broadcast appears in subframe #0 of each frame, while the power 44 representing the transmitted reference signals and the power 46 representing the transmitted data appear in all subframes.

The present invention relates primarily to a communications system in which a UE takes measurements on selected resource blocks, in order to be able to report RSRP and RSRQ As can be seen from a comparison of FIGS. 4 and 5 on the one hand, and FIGS. 6 and 7 on the other hand, the power fluctuation between resource blocks will depend on whether there are any UEs in the cell, and on how the transmissions are scheduled, in time and in frequency.

For example, if all downlink transmissions to UEs are scheduled outside the six central resource blocks that form the measured bandwidth, the power distribution over time in that measured bandwidth would be as shown in FIG. 4, even in the case of a relatively highly loaded cell. By contrast, if for example all downlink transmissions to UEs are scheduled within the measured bandwidth, then a power distribution over time would be similar to that shown in FIG. 6 for resource blocks within the measured bandwidth, but there would be less power outside the measured bandwidth.

One way to mitigate the effect of varying measured RSSI is to schedule downlink transmissions within the measured bandwidth in such a way that the power is kept constant or at a level that is proportional to the load in the cell.

Figure 8:
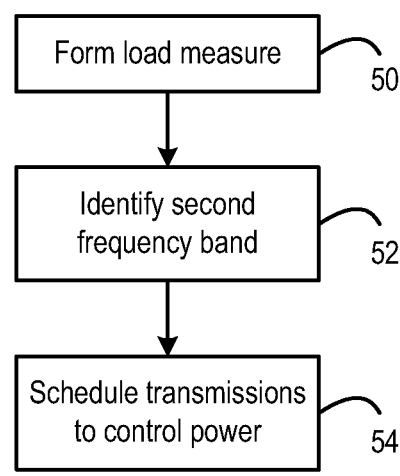
FIG. 8 is a flow chart illustrating a method in accordance with an aspect of the present invention.

FIG. 8 is a flow chart, illustrating a method in accordance with the present invention, performed within the processor 26 controlling the operation of the eNodeB 10. The processor is able to obtain all of the information required and to make the necessary decisions, for example based on measurement results that it receives, or based on measurements that it itself makes. In step 50, the processor forms a measure of the load in the cell. In one embodiment, the load is the "traffic load", that is, the Radio Resource load on the cell caused by the traffic requirements of the UEs that are active in the cell. For example, cell traffic load estimates can be obtained by using a sliding window and calculating the number of resource blocks used either in the uplink or the downlink for UE scheduling during the time window. Another load estimation method can be to take the average power transmitted on the downlink by the cell for UE scheduling during the time window. Another load estimation method could be to calculate the average probability that a resource block will be used in the downlink for scheduling transmission to a UE during the window time.

However, in other embodiments, the processor can form a measure of any other form of load on the cell, such as the hardware load, transport network load, the processing load, or the control signalling load on the base station itself, or any other measure. Further, the measure of the load can be obtained from the uplink interference, or the uplink resource usage.

In step 52, the processor identifies a second frequency band, within the overall frequency band in which it is to transmit signals. This second frequency band will typically be a subset in the centre of the overall frequency band, but may be equal to the overall frequency band. The second frequency band is typically the frequency band within which any UEs will make downlink quality measurements.

In step 54, the processor schedules the downlink transmissions from the base station, and specifically it schedules the downlink transmissions in such a way that the power in the second frequency band is controlled to be at a selected level. As will be described in more detail below, the transmissions can be scheduled such that the average power is controlled, or such that the average power in selected time periods is controlled.

As will be apparent, the primary purpose of this procedure is to be able to transmit signals in such a way that measurements made by UEs are influenced according to the intentions of the network. Primarily, the intention might be to allow the UE to form an accurate view of the load in the cell, in order to be able to determine whether they have a high probability of receiving a good service from the cell. However, a secondary purpose can be to deliberately transmit signals in such a way that UEs obtain a false impression of the load in the cell. For example, the procedure may be performed in such a way that a UE determines from its measurements that the load is relatively high, even when it is in fact relatively low. This allows the load to be reduced intentionally, for example when carrying out maintenance, upgrades etc.

Even if there are no UE's in the cell to schedule transmissions to, the cell can schedule dummy transmissions, so that the measured RSRQ is maintained at a desired level. That is, there will be certain traffic that the cell will be required to schedule, depending on the number of UEs in the cell and their data requirements. Once these transmissions have been scheduled, it is possible to schedule transmissions that are not required by any UE, simply for the purposes of ensuring that the RSRQ measurements made by the UEs reflect the load measure made by the cell.

Figure 9:
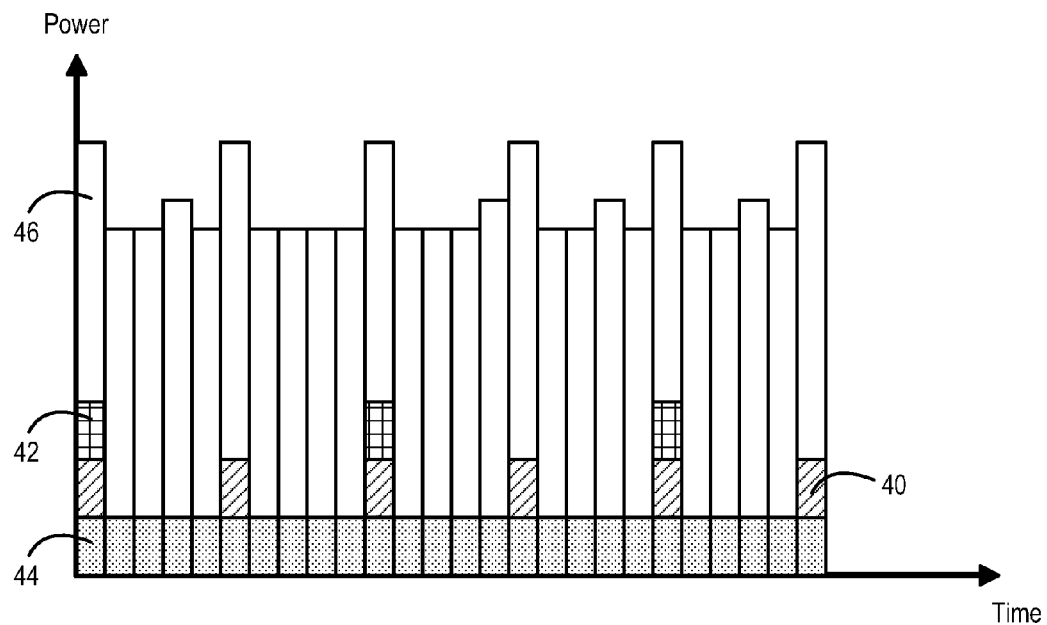
FIGS. 9 and 10 illustrate alternative power distributions over time and frequency in specific circumstances in use of the invention.
Figure 10:
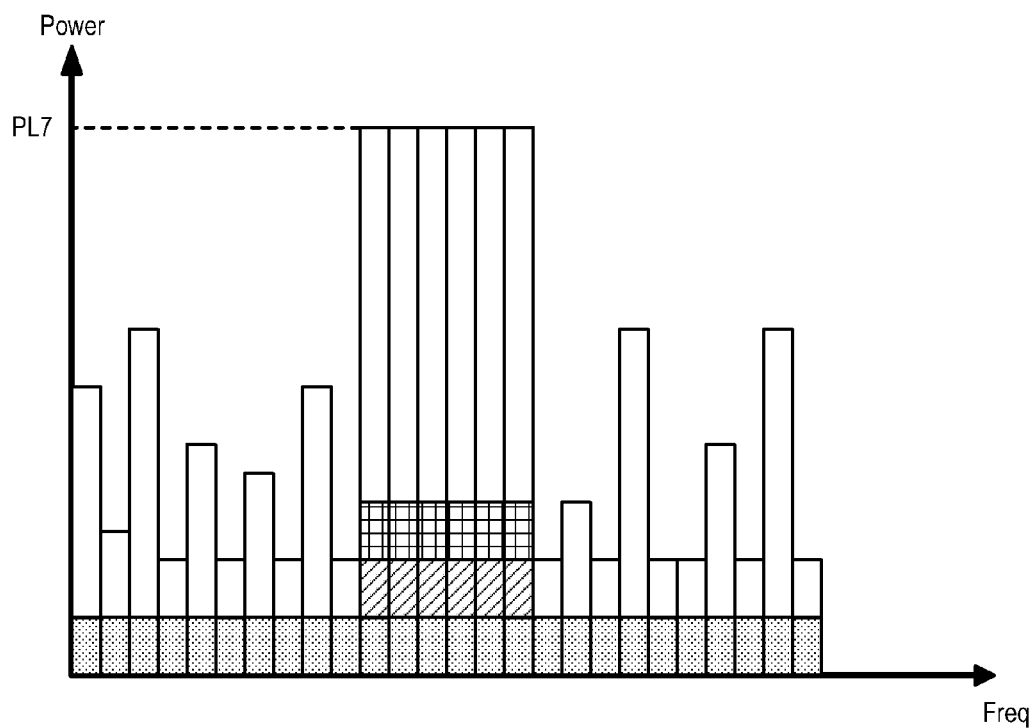

FIGS. 9 and 10 show respectively the variation with time and frequency of the power transmitted on resource blocks, illustrating one possible result of applying the present invention. The power 40 representing the transmitted synchronization channel appears in subframes #0, 4, 5 and 9 in each frame, and the power 42 representing the transmitted system broadcast appears in subframe #0 of each frame, while the power 44 representing the transmitted reference signals and the power 46 representing the transmitted data appear in all subframes.

In this case, the power level is maintained at a constant level PL7 in the frequency band, equivalent to six resource blocks, on which the UE makes its downlink measurements.

The constant power level PL7 is relatively high, to reflect a high load in the cell.

The transmissions are maintained in this way, so that the average transmitted power remains substantially constant, over multiple frames. For example, in order to allow the UE to make successful measurements at the desired power level, the controlled power level should be slowly varying, for example over a timescale of 10-60 seconds.

Figure 11:
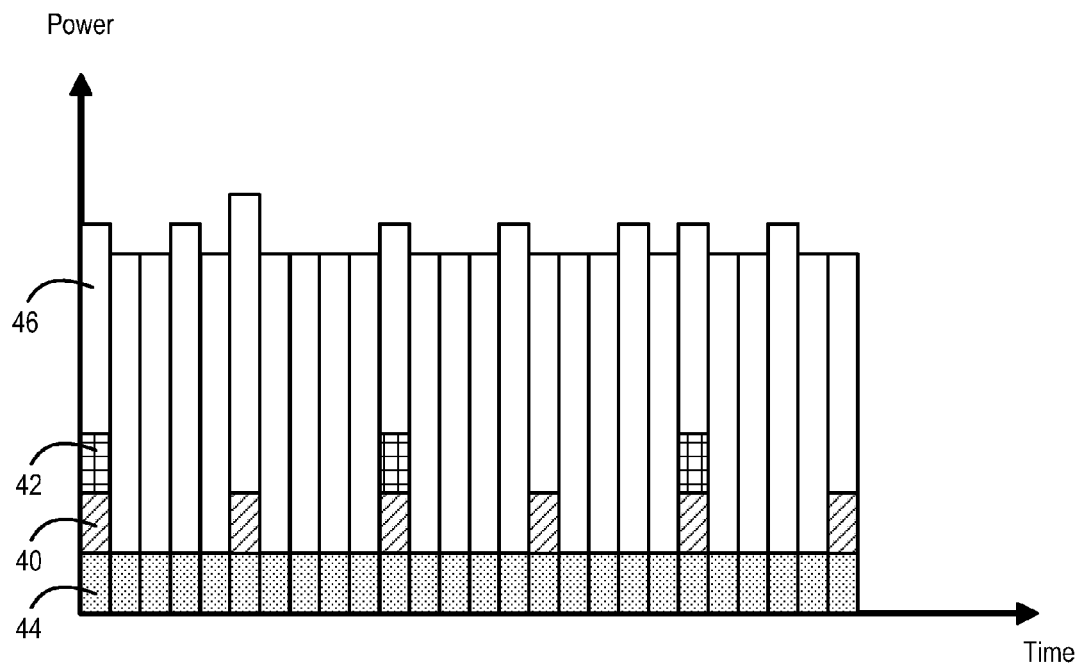
FIGS. 11 and 12 illustrate alternative power distributions over time and frequency in specific circumstances in use of the invention.
Figure 12:
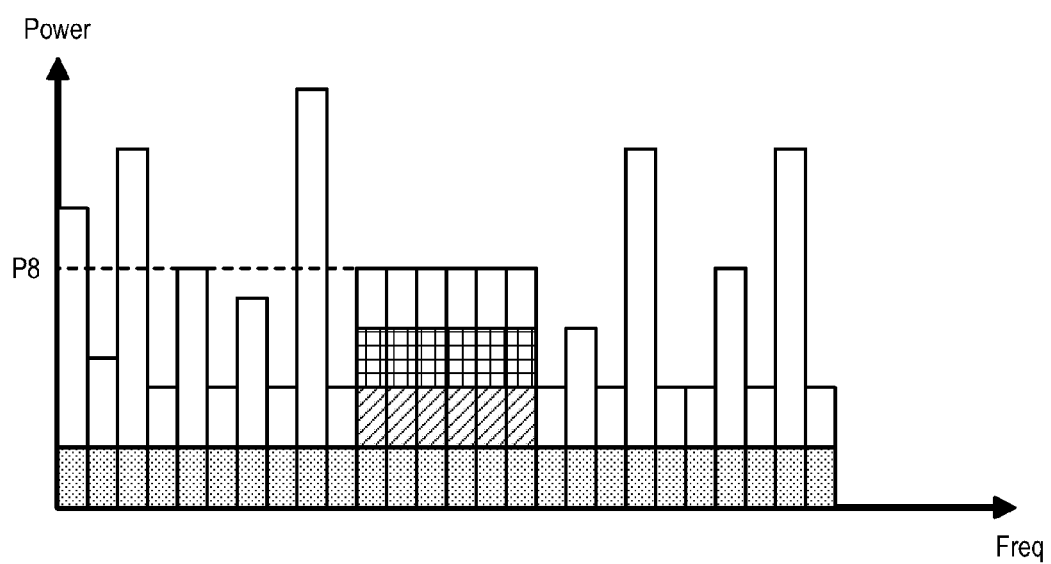

FIGS. 11 and 12 illustrate another possible result of applying the present invention. Again, the power 40 representing the transmitted synchronization channel appears in subframes #0, 4, 5 and 9 of each frame, and the power 42 representing the transmitted system broadcast appears in subframe #0 of each frame, while the power 44 representing the transmitted reference signals and the power 46 representing the transmitted data appear in all subframes.

In this case, during each frame, in the frequency band on which the UE makes its downlink measurements, the power level is maintained at a first constant level PL8 during subframes #0, 4, 5 and 9.

Figure 13:
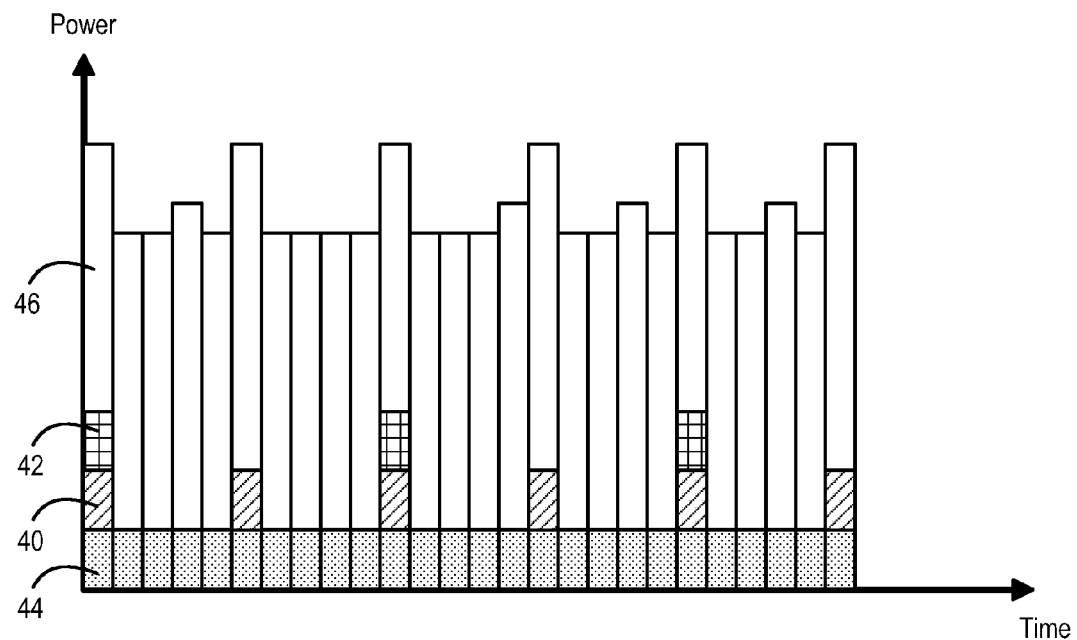
FIGS. 13 and 14 illustrate alternative power distributions over time and frequency in specific circumstances in use of the invention.
Figure 14:
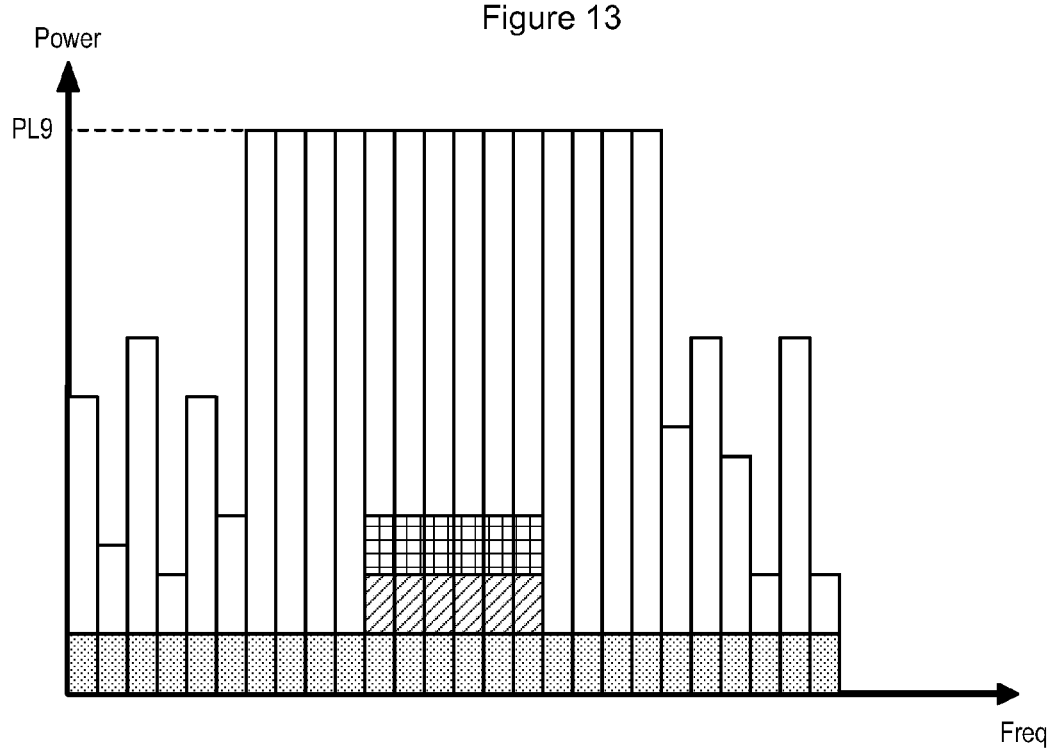

FIGS. 13 and 14 illustrate another possible result of applying the present invention. Again, the power 40 representing the transmitted synchronization channel appears in subframes #0, 4, 5 and 9 of each frame, and the power 42 representing the transmitted system broadcast appears in subframe #0 of each frame, while the power 44 representing the transmitted reference signals and the power 46 representing the transmitted data appear in all subframes.

In this case, the downlink transmission power is maintained at a constant level PL9, reflecting a high load in the cell, over a wider frequency range than just the six centre resource blocks.

Figure 15:
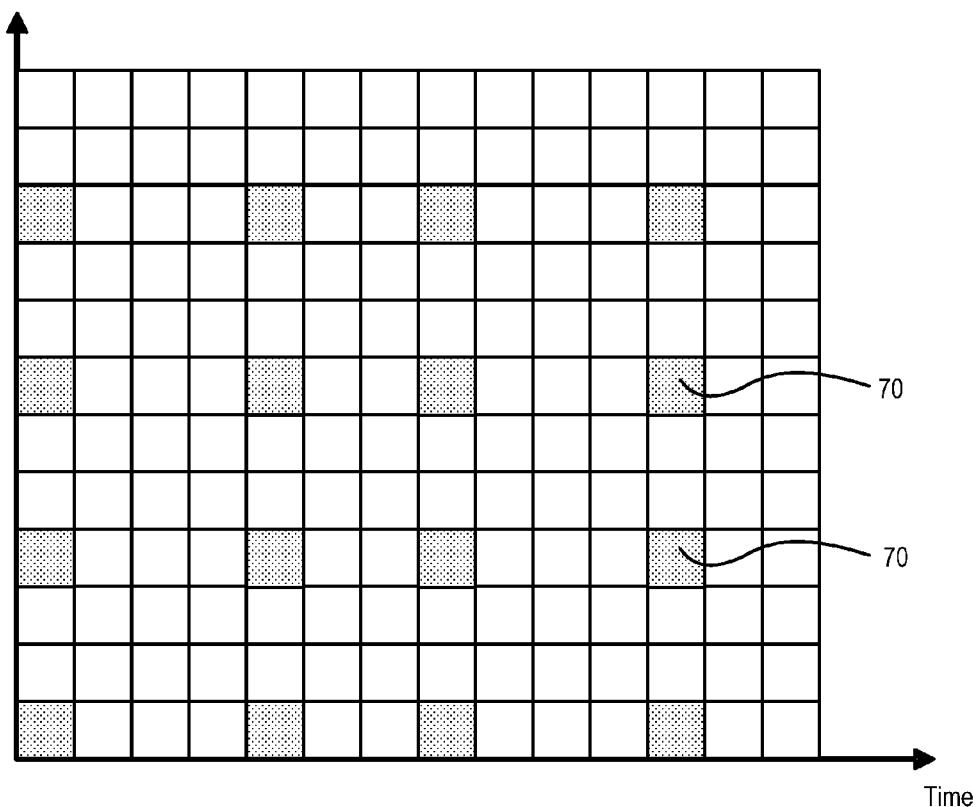
FIG. 15 illustrates the use of reference symbols.
Figure 16:
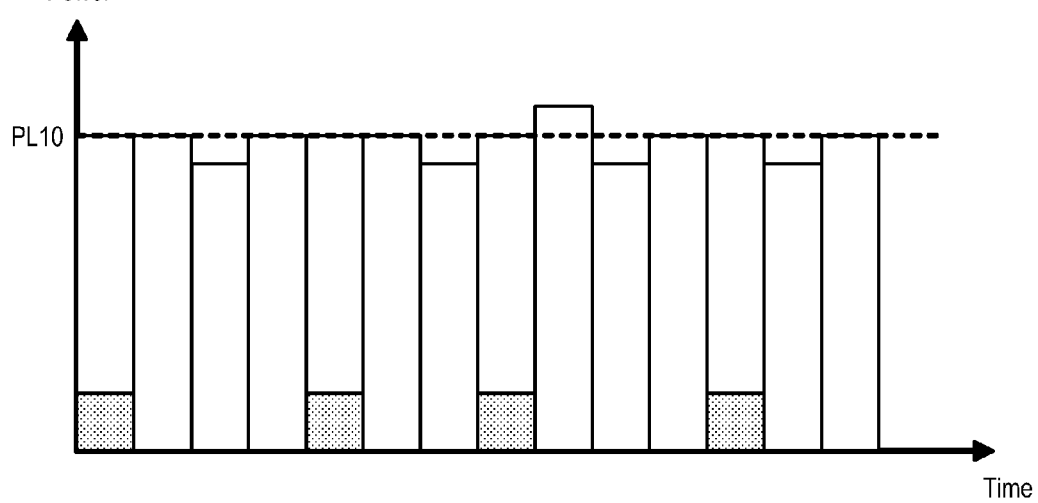
FIG. 16 illustrates the control of power during symbol periods when reference symbols are transmitted, in accordance with the invention.

FIGS. 15 and 16 illustrate the possibility of controlling the power to be at a level that reflects the load measure, but only in those symbol periods that are used for transmitting reference symbols.

Thus, FIG. 15 shows the reference symbols 70 shaded, and shows that reference symbols are only transmitted in certain symbol periods.

FIG. 16 shows the power levels during the symbol periods, and shows that the power level is maintained at a constant level PL10 during those symbol periods during which reference symbols are transmitted.

Figure 17:
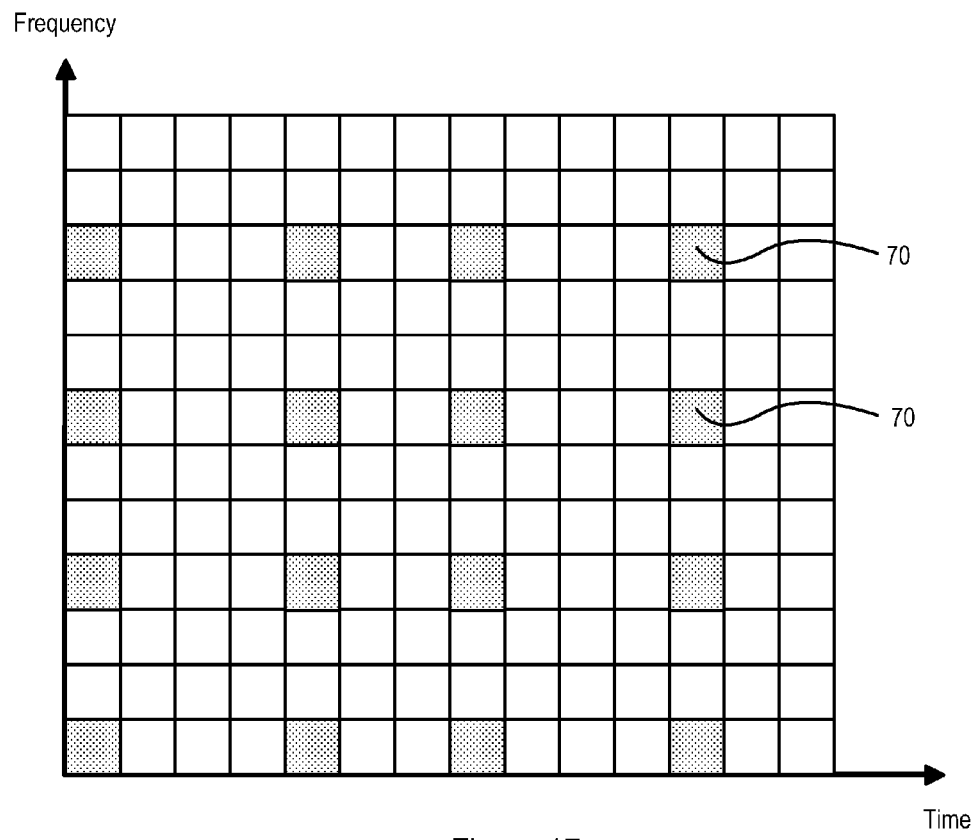
FIG. 17 illustrates the use of reference symbols.
Figure 18:
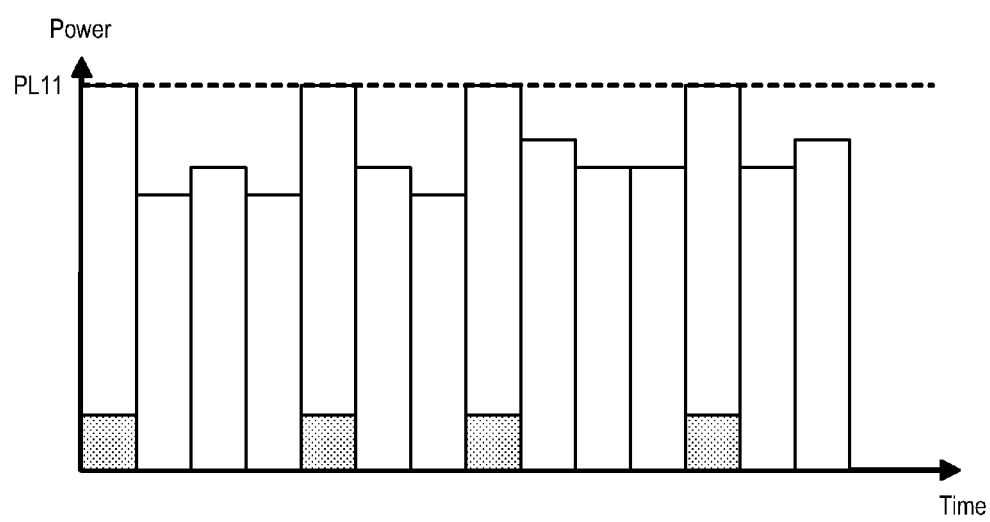
FIG. 18 illustrates an alternative control of power during symbol periods when reference symbols are transmitted, in accordance with the invention.

Similarly, FIGS. 17 and 18 illustrate a further possibility of controlling the power to be at a level that reflects the load measure, but only in those symbol periods that are used for transmitting reference symbols.

Thus, FIG. 17 shows the reference symbols 70 shaded, and shows that reference symbols are only transmitted in certain symbol periods.

FIG. 18 shows the power levels during the symbol periods, and shows that the power level is maintained at a constant level PL11 during those symbol periods during which reference symbols are transmitted.

The power level PL11 is higher than the power level PL10, showing that FIG. 18 represents a situation where the load measure indicates a higher load than FIG. 16.

There is this described a situation in which the power is controlled during certain symbol periods in certain resource blocks to be at a level which indicates a measured load, but in which the power is not controlled during other symbol periods.

By adding power when reference symbols are transmitted, less power can be used for achieving the same effect on the RSRQ, but it is preferable that the power levels for different symbols at the same frequency shall not differ too much, so that there is a smaller dynamic range.

In one embodiment of the invention, the UE is instructed by the eNodeB which resource blocks it should use to make measurements. For example, this may be appropriate when the UE is moving at high speed, or when the cell is small. For example, the UE could be instructed to measure RSSI only in specific subframes.

As a more specific example, the UE could be instructed to measure RSRQ only in resource blocks that are adjacent in time, just before and just after, the resource blocks carrying the synchronization channels.

In some embodiments of the invention, the power is not controlled in other resource blocks, in order to avoid excessive interference in the BW where synchronization channels and system broadcast transmission is done. This means that the special transmission, to enable the UEs, need only to be done on 6 RB out of 100 in total for a BW.

An advantage is the invention makes it possible to keep the transmitted power to be constant over the time and frequency at which the Reference Symbol Received Power (RSRP) and RSRQ are measured by the UE or intentionally be proportional to the load in the cell. This will also imply that the Reference Symbol Received Quality (RSRQ) will be comparable between cells even for cells with very different scheduling strategy for RB not used for RSRQ and RSRP measurements.

The invention claimed is:

1. A method for controlling a cell, wherein the cell is assigned a first frequency carrier spanning a first frequency band and downlink transmissions to specific mobile terminals are scheduled in time and in frequency over the first frequency carrier, and wherein the first frequency carrier includes a second frequency band over which the mobile terminals obtain downlink quality measurements for the first frequency carrier, the second frequency band being smaller than the first frequency band, the method comprising:
   forming an average load measure relating to the cell;
   determining a desired downlink quality measurement for the cell; and
   inducing the receiving mobile terminals to obtain the desired downlink quality measurement for the first frequency carrier by controlling the power transmitted in the second frequency band based on the average load measure.

2. The method of claim 1:
   wherein time is scheduled in frames and the frames are divided in time and frequency into resource blocks; and
   wherein the controlling the power transmitted in the second frequency band comprises controlling the power transmitted in predefined resource blocks in the frame.

3. The method of claim 2, wherein the predefined resource blocks are resource blocks that always carry reference symbols.

4. The method of claim 1:
   wherein time is scheduled in frames and the frames are divided in time and frequency into resource elements; and
   wherein the controlling the power transmitted in the second frequency band comprises controlling the power transmitted in predefined resource elements in the frame.

5. The method of claim 1, wherein the controlling the power transmitted in the second frequency band comprises maintaining the power at a substantially constant level for a plurality of frames.

6. The method of claim 1, wherein the forming the average load measure relating to the cell comprises measuring the power transmitted over the first frequency carrier, and averaging the measured power over time.

7. The method of claim 6, wherein the forming the average load measure relating to the cell comprises measuring the power transmitted over the first frequency carrier relative to the bandwidth of the first frequency carrier.

8. The method of claim 1, wherein the controlling the power transmitted in the second frequency band to reflect the average load measure comprises scheduling required transmissions in said second frequency band.

9. The method of claim 1, wherein the controlling the power transmitted in the second frequency band to reflect the average load measure comprises scheduling non-required transmissions in said second frequency band.

10. A method for controlling a cell, wherein the cell is assigned a first frequency carrier and downlink transmissions to specific mobile terminals are scheduled in time and in frequency over the first frequency carrier, and wherein the first frequency carrier includes a second frequency band, the method comprising:
   forming an average load measure relating to the cell; and
   controlling the power transmitted in the second frequency band to reflect the average load measure;
   wherein time is scheduled in frames and the frames are divided in time and frequency into resource blocks;
   wherein the controlling comprises controlling the power transmitted in predefined resource blocks in the frame; and
   wherein the predefined resource blocks are resource blocks carrying reference symbols but neither carrying system broadcast nor a synchronization channel.

11. A method for controlling a cell, wherein the cell is assigned a first frequency carrier and downlink transmissions to specific mobile terminals are scheduled in time and in frequency over the first frequency carrier, and wherein the first frequency carrier includes a second frequency band, the method comprising:
   forming an average load measure relating to the cell; and
   controlling the power transmitted in the second frequency band to reflect the average load measure;
   wherein time is scheduled in frames and the frames are divided in time and frequency into resource elements;
   wherein the controlling comprises controlling the power transmitted in predefined resource elements in the frame; and
   wherein the predefined resource elements are resource elements transmitted at the same time instances as other resource elements carrying reference symbols.

12. A network node, for use in a cell of a cellular radio communication system, wherein the cell is assigned a first frequency carrier spanning a first frequency band and downlink transmissions to specific mobile terminals are scheduled in time and in frequency over the first frequency carrier, wherein the first frequency carrier includes a second frequency band over which the mobile terminals obtain downlink quality measurements for the first frequency carrier, wherein the second frequency band is smaller than the first frequency band, and wherein the network node is configured to:
   form an average load measure relating to the cell;
   determine a desired downlink quality measurement for the cell; and
   induce the receiving mobile terminals to obtain the desired downlink quality measurement for the first frequency carrier by controlling the power transmitted in the second frequency band based on the average load measure.

13. The network node of claim 12:
   wherein time is scheduled in frames and the frames are divided in time and frequency into resource blocks; and
   wherein the network node is configured to control the power transmitted in the second frequency band by controlling the power transmitted in predefined resource blocks in the frame.

14. The network node of claim 12:
   wherein time is scheduled in frames and the frames are divided in time and frequency into resource elements; and
   wherein the network node is configured to control the power transmitted in the second frequency band by controlling the power transmitted in predefined resource elements in the frame.

15. The network node of claim 12, wherein the network node is further configured to control the power transmitted in the second frequency band by maintaining the power at a substantially constant level for a plurality of frames.

16. The network node of claim 12, wherein the network node is further configured to form the average load measure relating to the cell by measuring the power transmitted over the first frequency carrier, and averaging the measured power over time.

17. The network node of claim 12, wherein the network node is further configured to control the power transmitted in the second frequency band to reflect the average load measure by scheduling required transmissions in said second frequency band.

18. The network node of claim 12, wherein the network node is further configured to control the power transmitted in the second frequency band to reflect the average load measure by scheduling non-required transmissions in said second frequency band.

19. The network node of claim 12, wherein the network node is an eNodeB.

20. A network node, for use in a cell of a cellular radio communication system, wherein the cell is assigned a first frequency carrier and downlink transmissions to specific mobile terminals are scheduled in time and in frequency over the first frequency carrier, wherein the first frequency carrier includes a second frequency band, and wherein the network node is configured to:
   form an average load measure relating to the cell; and
   control the power transmitted in the second frequency band to reflect the average load measure;
   wherein time is scheduled in frames and the frames are divided in time and frequency into resource elements;
   wherein the network node is configured to control the power transmitted in the second frequency band by controlling the power transmitted in predefined resource elements in the frame; and
   wherein the predefined resource elements are resource elements transmitted at the same time instances as other resource elements carrying reference symbols.

* * * * *